(12) United States Patent
Westerfield

(10) Patent No.: US 9,807,988 B2
(45) Date of Patent: Nov. 7, 2017

(54) LOCKING FISHING REEL SEAT

(71) Applicant: G Loomis, Inc., Woodland, WA (US)

(72) Inventor: James Westerfield, Vancouver, WA (US)

(73) Assignee: G. LOOMIS, INC., Woodland, WA (US)

( * ) Notice: Subject to any disclaimer, the term of this patent is extended or adjusted under 35 U.S.C. 154(b) by 360 days.

(21) Appl. No.: 14/322,013

(22) Filed: Jul. 2, 2014

(65) Prior Publication Data

US 2015/0007482 A1 Jan. 8, 2015

Related U.S. Application Data

(60) Provisional application No. 61/842,493, filed on Jul. 3, 2013.

(51) Int. Cl.
*A01K 87/06* (2006.01)
*A01K 89/015* (2006.01)
*A01K 89/01* (2006.01)

(52) U.S. Cl.
CPC ........ *A01K 87/06* (2013.01); *A01K 89/01127* (2015.05); *A01K 89/01925* (2015.05)

(58) Field of Classification Search
CPC .. A01K 87/06; A01K 87/00; A01K 89/01127; A01K 89/01925; Y10S 292/49
USPC ............. 43/22, 23, 18.1 R; 292/256, 256.65, 292/256.69
See application file for complete search history.

(56) References Cited

U.S. PATENT DOCUMENTS

| | | | |
|---|---|---|---|
| 2,027,243 A | 1/1936 | Miller | |
| 2,479,952 A * | 8/1949 | Matson | A01K 87/06 43/22 |
| 2,503,510 A * | 4/1950 | Rives | A01K 87/06 43/22 |
| 2,543,881 A | 3/1951 | Umphlette et al. | |
| 2,546,341 A * | 3/1951 | Morris | A01K 87/06 43/22 |
| 2,742,728 A * | 4/1956 | Boyd | A01K 87/025 43/18.5 |
| 3,047,974 A * | 8/1962 | Stephens | A01K 87/06 43/22 |
| 3,197,908 A | 8/1965 | Hirsch | |
| 3,229,405 A * | 1/1966 | Veeder | A01K 87/08 43/18.1 R |
| 3,461,594 A | 8/1969 | Ohmura | |

(Continued)

FOREIGN PATENT DOCUMENTS

EP 0007797 7/1981
JP 002530447 Y2 * 3/1997

(Continued)

OTHER PUBLICATIONS

"Plate Reel Seats," AnglersResource, 2011, 2 pages [retrieved from: http://anglersresource.net/PlateReelSeats.aspx].

(Continued)

*Primary Examiner* — Darren W Ark
*Assistant Examiner* — Magdalena Topolski
(74) *Attorney, Agent, or Firm* — Jeffer Mangels Butler & Mitchell LLP; Brennan C. Swain, Esq.

(57) ABSTRACT

A reel seat for fishing rods is provided. The reel comprises a body, a sliding hood, a linkage, and a lever. The lever actuates the sliding hood to compressively secure a fishing reel to the fishing rod.

13 Claims, 14 Drawing Sheets

(56) References Cited

U.S. PATENT DOCUMENTS

| | | | |
|---|---|---|---|
| 3,570,165 | A * | 3/1971 | Murvall ............... A01K 87/06 43/22 |
| 4,077,150 | A | 3/1978 | Barnes |
| 4,187,633 | A | 2/1980 | Ohmura |
| 4,237,640 | A | 12/1980 | Sato |
| 4,403,439 | A | 9/1983 | Wallace |
| 4,432,155 | A | 2/1984 | Miller |
| 4,485,580 | A | 12/1984 | Ohmura |
| 4,494,333 | A | 1/1985 | Jacobson |
| 4,554,755 | A | 11/1985 | Hsu |
| 4,726,139 | A | 2/1988 | Tokuda |
| 4,756,114 | A | 7/1988 | Ohmura |
| 5,377,441 | A | 1/1995 | Noda |
| 5,481,820 | A | 1/1996 | Ohmura |
| 5,904,000 | A | 5/1999 | Ohmura |
| 6,000,164 | A | 12/1999 | Maeda |
| 6,067,740 | A | 5/2000 | Alley |
| 6,105,301 | A | 8/2000 | Ohmura |
| 6,381,898 | B1 | 5/2002 | Lee |
| D518,868 | S | 4/2006 | Von Mohr et al. |
| 7,086,195 | B2 | 8/2006 | Borgeat |
| 7,114,282 | B2 | 10/2006 | Nakagawa |
| 7,159,355 | B2 | 1/2007 | Ohmura |
| 7,377,070 | B2 | 5/2008 | Bingham |
| 7,752,800 | B2 | 7/2010 | Leyden et al. |
| D676,522 | S | 2/2013 | Halseth et al. |
| 2004/0211108 | A1 | 10/2004 | Ezuka |
| 2009/0255167 | A1 | 10/2009 | Mullane |
| 2012/0311915 | A1 | 12/2012 | Huang |
| 2013/0283665 | A1 | 10/2013 | Poe et al. |

FOREIGN PATENT DOCUMENTS

| | | | |
|---|---|---|---|
| JP | 002844285 B2 * | 1/1999 | |
| JP | 004148510 B2 * | 9/2008 | |
| JP | 004446381 B2 * | 4/2010 | |
| JP | 2010-233484 | 10/2010 | |
| JP | 004688197 B2 * | 5/2011 | |
| JP | 005041432 B2 * | 8/2012 | |
| JP | 005207764 B2 * | 6/2013 | |

OTHER PUBLICATIONS

"The most unique fly rod concept ever pre-order," Indiegogo, 2013, 20 pages [retrieved from: https://web.archive.org/web/20130407152624/http://www.indiegogo.com/projects/the-most-unique-fly-rod-concept-ever-pre-order].

International Search Report and Written Opinion for International (PCT) Patent Application No. PCT/US2013/035429, dated Jul. 11, 2013 8 pages.

Official Action for U.S. Appl. No. 13/857,423, dated Apr. 15, 2015 9 pages.

International Preliminary Report on Patentability for International (PCT) Patent Application No. PCT/US2013/035429, dated Oct. 16, 2014, 6 pages.

* cited by examiner

LOCKING FISHING REEL SEAT

CROSS-REFERENCE TO RELATED APPLICATIONS

This application claims priority under 35 U.S.C. §119(e) to U.S. Provisional Patent Application Ser. No. 61/842,493 filed Jul. 3, 2013, which is incorporated herein in its entirety by reference.

FIELD OF THE INVENTION

The present invention relates to fishing rods and, more particularly, to a fishing rod reel seat for releasably attaching a fishing reel to a fishing rod.

BACKGROUND

Fishing rods are known to comprise a handle portion and a reel portion. The handle portion is proximal to a user and has a grip which is useful for manipulating the fishing rod. Fishing rods generally include a reel seat attached to the handle. Reel seats are provided in numerous forms and engage with a reel foot of a fishing reel to releasably attach the fishing reel to the fishing rod.

Conventional fishing reel seats suffer from a number of disadvantages. Many known reel seats include a locking nut that clamps the fishing rod in place. Other known reel seats include locking grooves extending perpendicular to a length of the rod that are engaged by a clamp to lock the reel seat in a position. These grooves may be exposed on the handle of the rod when the reel seat is in a closed position. Conventional fishing reel seats may also include exposed metal or plastic surfaces that wrap at least partially around the fishing rod and frequently have exposed screw threads. The locking nuts, locking grooves, and other exposed surfaces of conventional reel seats are often located in the handle portion of the fishing rod and interfere with the user's grip of the fishing rod. Contact between the user's hands and the exposed screw threads is uncomfortable, reduces the user's chances of detecting a bite or strike by a fish by decreasing the user's sense of feel, complicates the user's ability to grip the rod, and poses a risk of loosening the attachment of the fishing reel to the fishing rod.

Some known reel seats use adhesive tape to fasten the fishing reel directly onto the handle of the fishing rod. Still other known reel seats use mechanical fasteners such as wire, string, thread, or cords to secure the fishing reel directly to the handle of the fishing rod. Reel seats comprised of adhesive tape or mechanical fasteners are not easy to install and prohibit a user from quickly removing, installing, or adjusting the connection between a fishing reel and a fishing rod. Further, the user's hands frequently contact the adhesive tape or mechanical fastener. Contact with the adhesive tape is uncomfortable and may transfer adhesive to the user's hand, particularly on hot or sunny days. The contact with the user's hands may also loosen or damage the adhesive tape or mechanical fasteners such that they fail to adequately secure the reel to the rod.

Accordingly, there is an unmet need for a reel seat that enables a user to quickly install and remove a fishing reel in the reel seat and allows the user to grip a handle of a fishing rod without contacting components of the reel seat.

SUMMARY OF THE INVENTION

The apparatus and methods of this invention overcome each of the foregoing disadvantages. Additionally, the apparatus and methods of this invention achieve other advantages discussed more fully below. The present invention contemplates a novel system, device, and assembly methods for a fishing reel seat.

The following references are hereby incorporated by reference in their entirety: U.S. Pat. No. 2,027,243 to Miller, U.S. Pat. No. 3,461,594 to Ohmura, U.S. Pat. No. 4,237,640 to Sato, U.S. Pat. No. 4,494,333 to Jacobson, U.S. Pat. No. 4,554,755 to Hsu, U.S. Pat. No. 4,726,139 to Tokuda, U.S. Pat. No. 6,000,164 to Maeda, and European Patent No. 7,797 to Sato.

It is one aspect of the present invention to provide a reel seat adapted to releasably interconnect a reel foot of a fishing reel to a fishing rod. The reel seat generally comprises a body adapted to be secured to a shaft of the fishing rod. The body has a first hood with a shape adapted to retain a first end of the reel foot. A second hood is slideably interconnected to the body. The second hood has a shape adapted to retain a second end of the reel foot. A pivot end of a lever is pivotally interconnected to the body at a first pivot point. A lever end of a linkage is pivotally interconnected to the lever at a second pivot point between the first pivot point and a grip end of the lever. A hood end of the linkage is pivotally interconnected to the second hood at a third pivot point. A rotational force applied to the grip end of the lever is translated through the linkage to the second hood to move the second hood toward the first hood to compressively interconnect the reel foot in the reel seat. Optionally, the reel seat may further comprise a resistance member positioned in the first hood with two arms extending from the second hood contacting the resistance member when the reel seat is in a closed position.

In one embodiment, a length of the linkage can be increased or decreased. Optionally, the linkage may further comprise a linkage body with ends threadably engaged by two end pieces. Rotating the linkage body in a first direction increases the length of the linkage and rotating the linkage body in a second opposite direction decreases the length of the linkage. Optionally, the linkage may further comprise two or more telescoping members that are selectively adjustable to change the length of the linkage. In another embodiment, the lever further comprises two or more pairs of holes between the first pivot point and the grip end and the lever end of the linkage may be moved from a first to a second of the two or more pairs of holes to move a location of the second pivot point. In still another embodiment, the second hood further comprises two or more pairs of holes and the hood end of the linkage may be moved from a first to a second of the two or more pairs of holes to move a location of the third pivot point. In yet another embodiment, the resistance member is comprised of an elastomer, a thermoplastic polyurethane, a thermoplastic rubber, a thermoplastic elastomer, and combinations thereof. In still another embodiment, the resistance member is adapted to fit a reel foot of a predetermined size or shape. In yet another embodiment, the resistance member may be removed and replaced with a second resistance member of a different size and shape.

In one embodiment, two longitudinal grooves formed in the body and two protrusions extending from the second hood, each of the protrusions adapted to slidably engage one of the longitudinal grooves. In another embodiment, a cavity is formed in the body around a longitudinal axis of the fishing rod. An extension of the second hood wraps around the longitudinal axis within the cavity. In still another embodiment, two arms extend from the second hood. A forward end of each of the arms contacts a stop formed in the body when the reel seat is in a closed position. In yet another embodiment, the reel seat is located on a first side of the fishing rod and the reel seat does not extend to a surface portion of a second opposite side of the fishing rod.

It is another aspect of the present invention to provide a method of releasably securing a reel foot of a fishing reel to a fishing rod. This includes, but is not limited to, a method generally comprising: (1) moving a reel seat to an open position, the reel seat comprising: a body secured to a shaft of the fishing rod, the body having a first hood; a second hood interconnected to the body; a lever having a pivot end and a grip end, the pivot end pivotally interconnected to the body at a first pivot point; a linkage having a lever end and a hood end, the lever end of the linkage pivotally interconnected to the lever at a second pivot point between the first pivot point and the grip end, and the hood end of the linkage pivotally interconnected to the second hood at a third pivot point; (2) positioning the reel foot of the fishing reel between the first hood and the second hood; and (3) rotating the lever around the first pivot point to move the reel seat to a closed position, wherein the linkage moves the second hood toward the first hood to compressively secure the reel foot to the fishing rod.

In one embodiment, the method may further comprise adjusting a length of the linkage, wherein increasing the length of the linkage moves the second hood closer to the first hood when the reel seat is in the closed position. In another embodiment, the method may further comprise moving the second pivot point closer to the grip end of the lever to move the second hood closer to the first hood when the reel seat is in the closed position. In yet another embodiment, the method may further comprise selecting a resistance member to fit the reel foot and placing the resistance member in the first hood or the second hood. In still another embodiment, the method may further comprise: before moving the reel seat to the closed position, removing the linkage, wherein the linkage has a first length; selecting a second linkage with a second length; and interconnecting the second linkage to the lever and the second hood. In yet another embodiment, positioning the reel foot of the fishing reel between the first hood and the second hood further comprises: aligning the reel foot with a longitudinal axis of the fishing reel; positioning a first end of the reel foot at least partially within the first hood; and positioning a second end of the reel foot proximate to the second hood.

It is another aspect of the present invention to provide a reel seat adapted to receive and compressibly secure a reel foot of a fishing reel to a fishing rod. The reel seat generally comprises, but is not limited to, a body adapted to be secured to a shaft of the fishing rod. The body has a first hood shaped to retain a first end of the reel foot. A second hood with a hood shaped to retain a second end of the reel foot is slidably engaged to the body. A first end of a lever is pivotally interconnected to the second hood. A lever end of a linkage is pivotally interconnected to a second end of the lever. A body end of the linkage is pivotally interconnected to the body. In operation, a rotational force applied to the second end of the lever is translated to the second hood to move the second hood toward the first hood to compressively secure the reel foot in the reel seat. When the second hood moves toward the first hood, the second hood moves at least partially over the second end of the reel foot. In one embodiment, the reel seat may further comprise a longitudinal recess provided on the body and a protrusion provided on the second hood, the protrusion adapted to slide in the longitudinal recess.

The reel seat of the present disclosure provides numerous advantages, including, for example, a shape that provides an uninterrupted grip on one side of the handle in a position most likely to be gripped by the user when using the rod. The reel seat does not interfere with a user's grasp of the grip material of the fishing rod. In various embodiments, the reel seat does not wrap around the outside of the fishing rod, allowing for the fishing rod grip material to be substantially continuous and not be interrupted on the side of the rod opposite the reel seat. Another advantage of the present disclosure is a reel seat that enables a rod to have an uninterrupted grip in front of, opposite of, and behind the reel with no material in these regions other than the desired grip material.

The reel seat of the present disclosure also provides a means to quickly install and remove a fishing reel from the fishing pole that cannot be accidently unlocked by inadvertent contact between the user's hands and the reel seat.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements or components. Additional aspects of the present invention will become more readily apparent from the Detailed Description, particularly when taken together with the drawings.

The above-described embodiments, objectives, and configurations are neither complete nor exhaustive. As will be appreciated, other embodiments of the invention are possible using, alone or in combination, one or more of the features set forth above or described in detail below.

The phrases "at least one," "one or more," and "and/or," as used herein, are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

BRIEF DESCRIPTION OF THE DRAWINGS

The accompanying drawings, which are incorporated in and constitute a part of the specification, illustrate embodiments of the invention and together with the Summary of the Invention given above and the Detailed Description of the drawings given below, serve to explain the principles of these embodiments. In certain instances, details that are not necessary for an understanding of the invention or that render other details difficult to perceive may have been omitted. It should be understood, of course, that the invention is not necessarily limited to the particular embodiments illustrated herein. Additionally, it should be understood that the drawings are not necessarily to scale.

Figure 1:
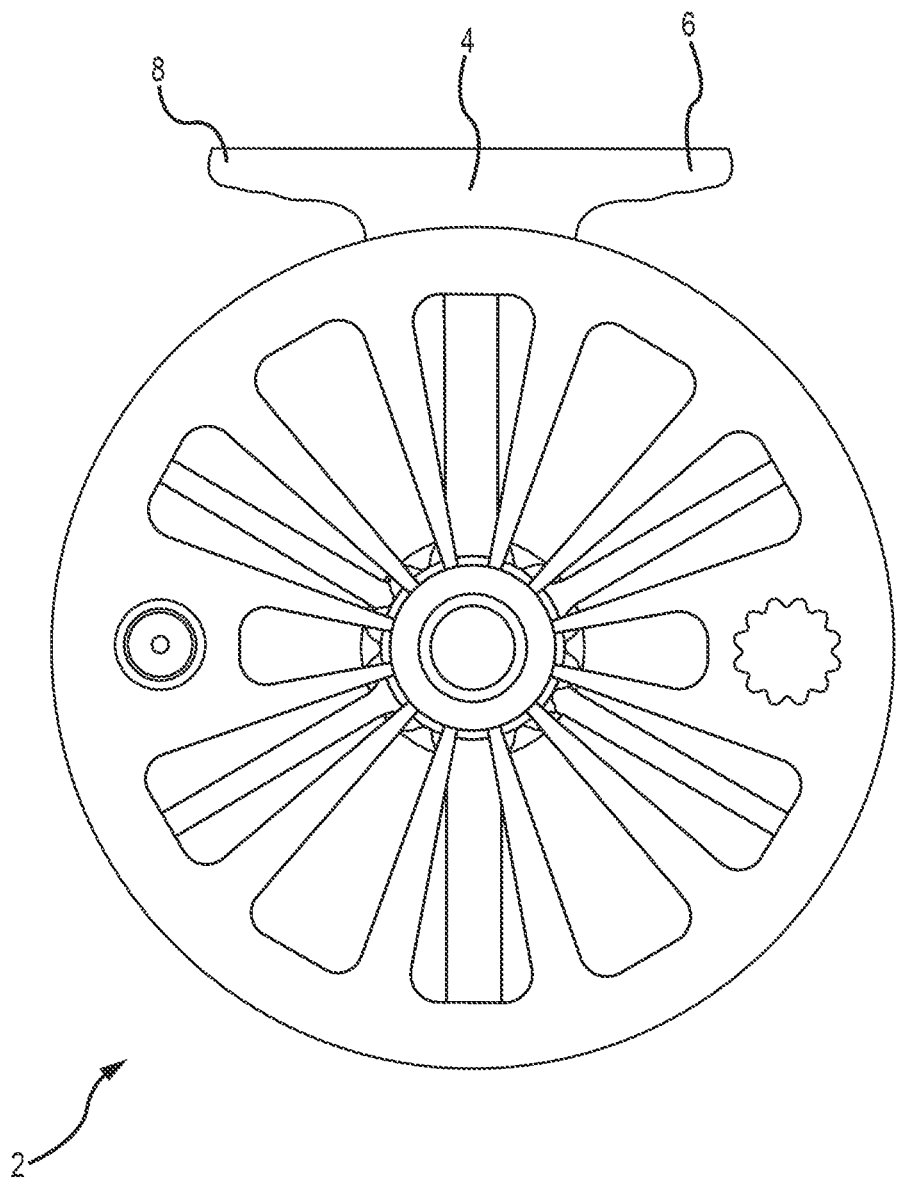
FIG. 1 is a side elevation view of a fishing reel.

Similar components and/or features may have the same reference label. Further, various components of the same type may be distinguished by following the reference label by a letter that distinguishes among the similar components. If only the first reference label is used, the description is applicable to any one of the similar components having the same first reference label irrespective of the second reference label.

A list of the various components shown in the drawings and associated numbering is provided herein:

| Number | Component |
|---|---|
| 2 | Fishing reel |
| 4 | Reel foot |
| 6 | First end |
| 8 | Second end |
| 10 | Reel seat |
| 12 | Fishing rod |
| 14 | Fishing rod handle |
| 16 | Fishing rod grip |
| 18 | Reel seat body |
| 20 | Second hood |
| 22 | Lever |
| 23 | Lever end of linkage |
| 24 | Linkage |
| 25 | Hood end of linkage |
| 26 | Forward end of body |
| 27 | Linkage length |
| 28 | Rearward end of body |
| 30 | First hood |
| 32 | First pivot point |
| 34 | Grip portion |
| 36 | Second pivot point |
| 38 | Third pivot point |
| 40 | Longitudinal axis of fishing rod |
| 42 | Gap |
| 44 | Grooves |
| 46 | Arms of second hood |
| 48 | Stop |
| 50 | Forward end of arms |
| 52 | Protrusion of second hood |
| 54 | Rearward end of groove |
| 56 | Linkage end pieces |
| 58 | Linkage body |
| 60 | Threaded ends |
| 62 | Grip |
| 64 | Holes |
| 66 | Pins |
| 68 | Holes |
| 70 | Resistance member |
| 72 | Extension of resistance member |
| 74 | Extension of second hood |
| 76 | First end of lever |
| 78 | Second end of lever |
| 80 | Rearward end of lever |
| 82 | Forward end of lever |
| 84 | Pin |

DETAILED DESCRIPTION

The present invention has significant benefits across a broad spectrum of endeavors. It is the Applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment that illustrates the best mode now contemplated for putting the invention into practice is described herein by, and with reference to, the annexed drawings that form a part of the specification. The exemplary embodiment is described in detail without attempting to describe all of the various forms and modifications in which the invention might be embodied. As such, the embodiments described herein are illustrative, and as will become apparent to those skilled in the arts, may be modified in numerous ways within the scope and spirit of the invention.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Referring now to FIG. 1, a fishing reel 2 is illustrated. The fishing reel 2 has a reel foot 4 with a first end 6 and a second end 8. It will be appreciated that the particular type of fishing reel 2 used with a reel seat of the present invention forms no part of the invention. Reel seats of the present invention may be used with a casting reel, a top mounted spinning reel, a flying fishing reel, or various other reels, as recognized by one of skill in the art. Further, any size reel foot 4 may be used with reel seats of the present invention.

Figure 2:
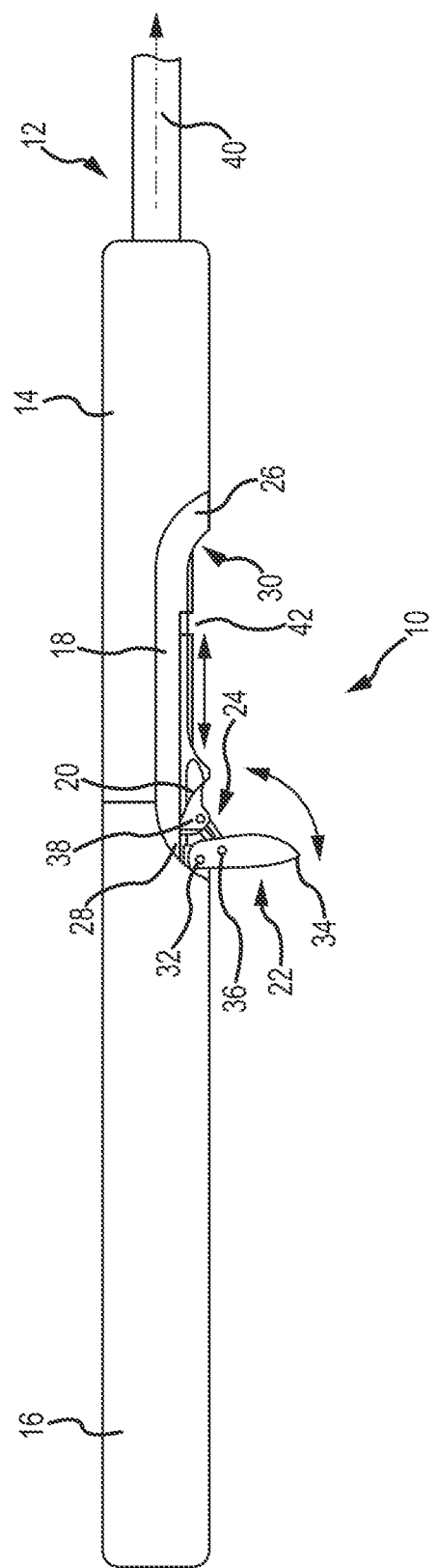
FIG. 2 is a side elevation view of a reel seat in an open position according to one embodiment of the present invention.

Referring now to FIG. 2, a reel seat 10 of one embodiment of the present invention is illustrated. The reel seat 10 is adapted to releasably secure a fishing reel 2 to a fishing rod 12 comprising a handle portion 14 and a grip portion 16. The reel seat 10 is secured to the handle 14 in a manner suitable for fishing operations. It will be appreciated that the specific type of fishing rod 12 used with the reel seat 10 of the present invention is not critical. It is contemplated that a reel seat 10 of the present invention may be used with a fishing rod 12 of and type, material, weight, or dimension. By way of example only, it is contemplated that reel seats 10 of the present invention may be used in combination with a fly rod, a surf rod, a casting rod, a spinning rod, an ice rod, or various other rods designed for specific fishing applications as will be recognized by one of ordinary skill in the art. The reel seat 10 is positioned substantially within the handle portion 14 and the grip portion 16 of the fishing rod 12, providing an uninterrupted grip surface on a top side of the fishing rod 12 opposite of the reel seat 10. Said another way, the reel seat 10 is positioned on a first side of the fishing rod 12 and does not extend to or interrupt the material of the handle portion 14 or the grip portion 16 on a second opposite side of the fishing rod 12. Thus, a user's hand can contact the material of the handle portion 14 and/or the grip portion 16 opposite of the reel seat 10 while fishing.

The reel seat 10 is comprised of a body 18, a second hood 20, a lever 22, and a linkage 24. The body 18 is generally stationary and has a forward end 26 and a rearward end 28 at the grip end 16 of the fishing rod 12. The forward end 26 of the body 18 includes a first hood 30 with a shape adapted to retain the first end 6 of the reel foot 4 of the fishing reel 2. In one embodiment, the first hood 30 is generally stationary. In another embodiment, the first hood 30 is movably interconnected to the body 18 and may be positioned by a user closer to, or further from, the forward end 26 to adjust the reel seat 10 to receive reel feet of a variety of sizes. The second hood 20 is slidingly interconnected to the body and can move at least partially between the forward end 26 and the rearward end 28 of the body 18. The second hood 20 has a shape adapted to retain second end 8 of the reel foot 4.

The lever 22 has a pivot end pivotally interconnected to the body 18 at a first pivot point 32 at the rearward end 28 of the body 18. A grip portion 34 is formed on the lever 22 at an end of the lever 22 opposite the first pivot point 32 and the pivot end. The lever 22 slidingly actuates the second hood 20 by the linkage 24. A lever end of the linkage 24 is pivotally interconnected to the lever 22 at a second pivot point 36 between the first pivot point 32 and the grip portion 34. A hood end of the linkage 24 is pivotally interconnected to the second hood 20 at a third pivot point 38. As a result, when the lever 22 is rotated about a pivot axis extending through the first pivot point 32, the rotational force applied to the grip portion 34 of the lever 22 is translated through the linkage 24 to the second hood 20 to move the second hood 20 toward the first hood 30 and away from the rearward end 28 of the body 18.

The reel seat 10 is illustrated in FIG. 2 in an open position. In the open position, the lever 22 is positioned substantially perpendicular to a longitudinal axis 40 which passes generally through a center of the fishing rod 12 and the second hood 20 is pulled back toward the rearward end 28 of the body. When the reel seat 10 is in the open position, a gap 42 is formed between the second hood 20 and body 18 and a distance between the second hood 20 and the first hood 30 is increased to enable the fishing reel 2 to be installed in the reel seat 10.

To secure a fishing reel 2 in the reel seat 10, the reel seat is moved to the open position by rotating the lever 22 about the first pivot point 32. The foot 4 of the fishing reel 2 is disposed between the second hood 20 and the first hood 30 with the first end 6 at least partially within the first hood 30. The second end 8 is positioned proximate to the second hood 20. The lever 22 is then rotated around the first pivot point 32 moving the second hood 20 toward the first hood 30. As the second hood 20 moves, it moves over the second end 8 compressing the foot 4 between the second hood 20 and the first hood 30. Thus, the reel seat 10 enables a user to quickly and easily remove or secure a variety of fishing reels 2 to the fishing rod 12.

Figure 3:
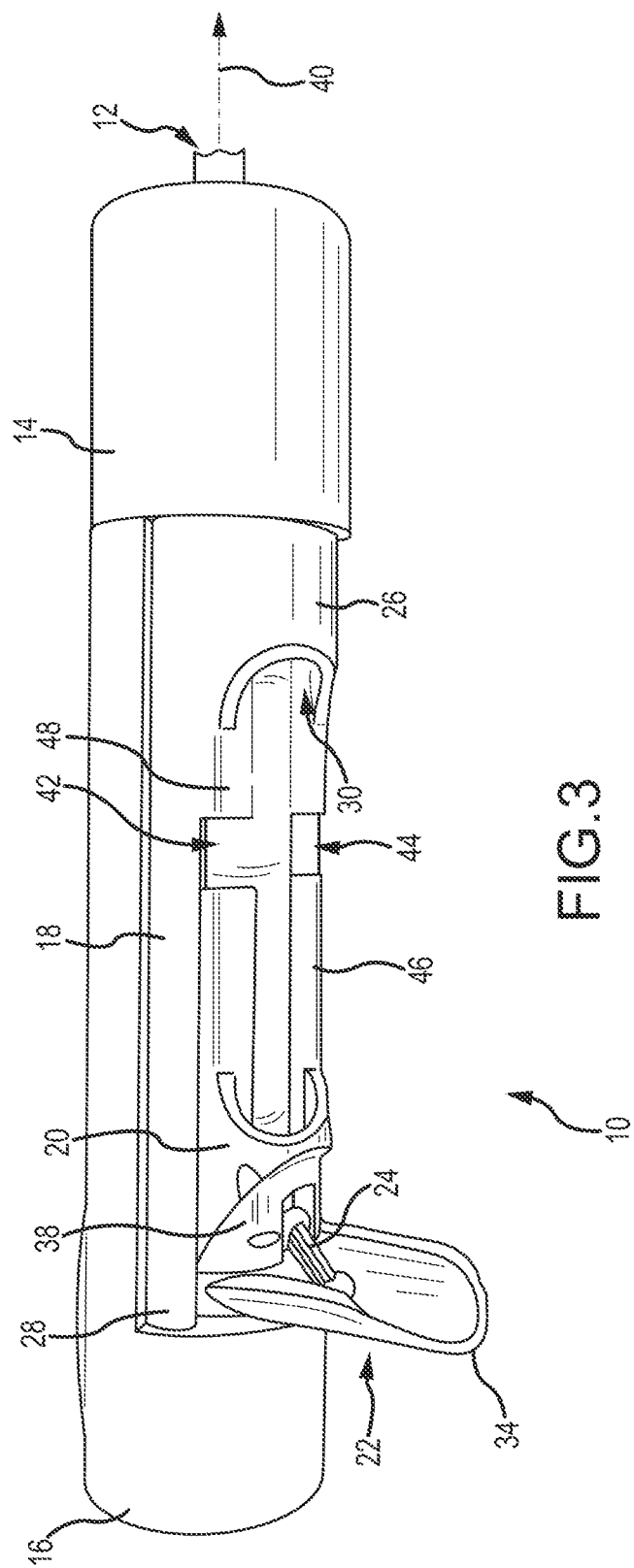
FIG. 3 is a perspective view of the reel seat of FIG. 2.

Referring now to FIG. 3, a perspective view of the reel seat 10 is provided in the open position. Two elongate recesses extend into the interior of the body 18 forming tracks or grooves 44. The grooves 44 have a length substantially parallel to the longitudinal axis 40. The grooves 44 extend from substantially the rearward end 28 of the body to a stop 48 proximate the first hood 30. The length of the grooves 44 is greater than a length of second hood 20.

Two arms 46 of the second hood 20 extend toward the forward end 26 of the body 18 along the longitudinal axis 40 of the fishing rod. The second hood 20 and the arms 46 have one or more protrusions, illustrated in FIG. 7, that extend into the interior of the body 18. The protrusions are adapted to slidably fit into the grooves 44 formed in the body 18. A distance between a forward end and a rearward end of the protrusions is less than the length of the grooves 44. The fit of the protrusions in the grooves 44 restricts or limits the movement of the second hood 20 to a direction substantially parallel to the longitudinal axis 40 between the forward end 26 and the rearward end 28 of the body 18. As shown in FIG. 3, in one embodiment, the second hood 20 and the first hood 30 have at least partially arcuate shapes adapted to retain the ends 6, 8 of the fishing reel 2.

Figure 4:
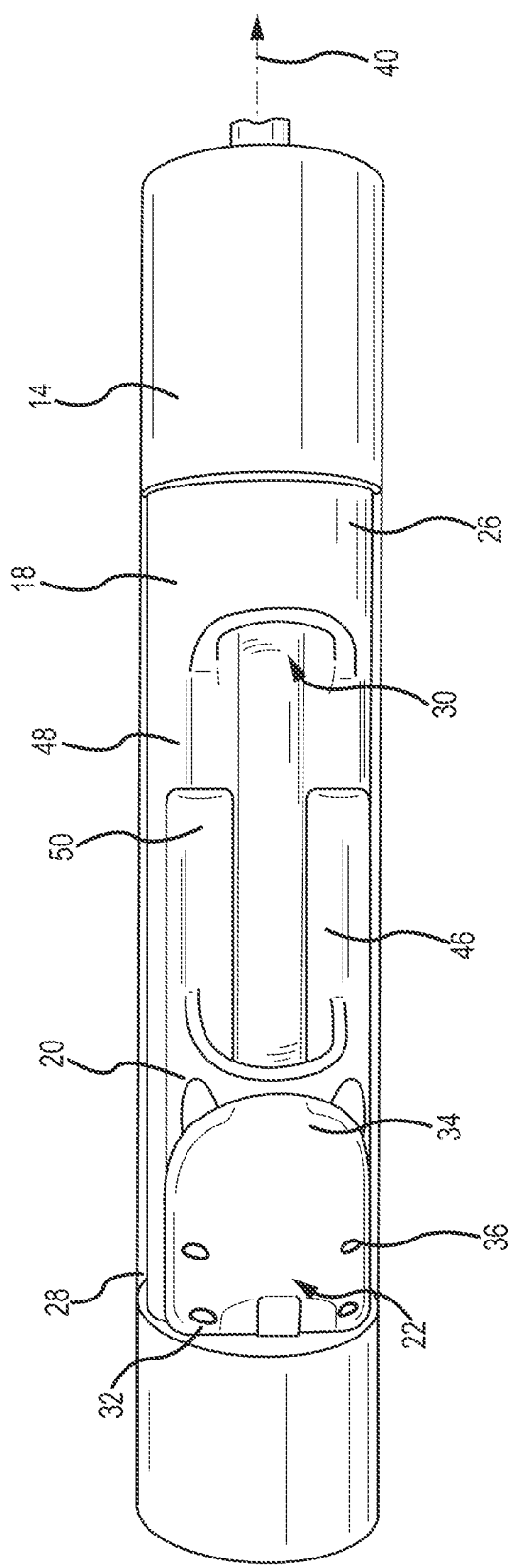
FIG. 4 is a top plan view of the reel seat of FIG. 2 in a closed position.

Referring now to FIG. 4, the reel seat 10 is illustrated in a closed position. The lever 22 has been rotated around the first pivot point 32 and is substantially parallel to the longitudinal axis 40. The second hood 20 is positioned at the forward end of the grooves 44 of the body 18. Forward ends 50 of the arms 46 contact and apply a compression force to the stops 48 of the body 18.

Figure 5:
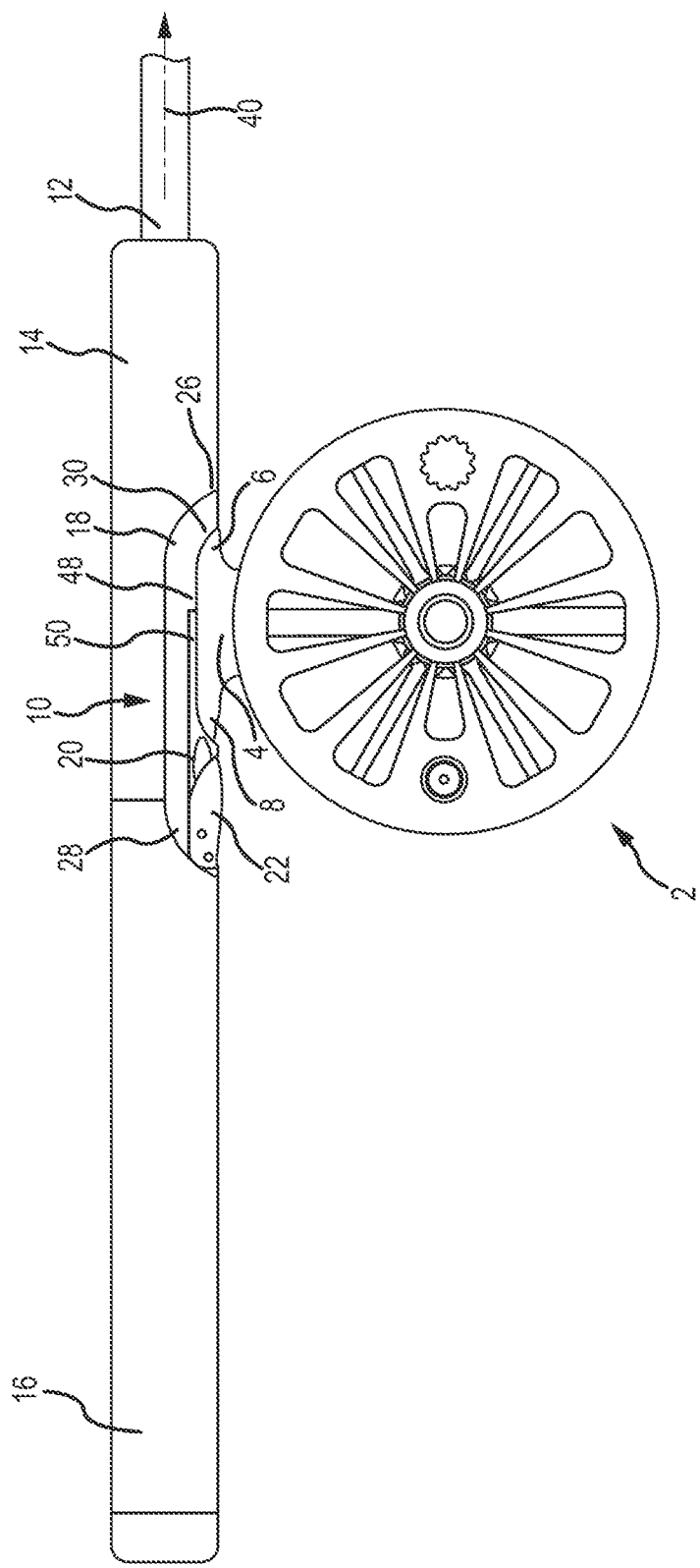
FIG. 5 is a side elevation view of the reel seat of FIG. 2 in the closed position with a fishing reel secured therein.

Referring now to FIG. 5, the reel seat 10 is illustrated in the closed position releasably securing a fishing reel 2 to the fishing rod 12. The lever 22 has been pivoted to a position substantially parallel to the longitudinal axis 40 thereby pushing the second hood 20 toward the first hood 30 and the forward end 26 of the body 18. The first hood 30 at least partially covers the first end 6 of the reel foot 4 and the second hood 20 at least partially covers the second end 8 of the reel foot 4. When the reel seat 10 is in the closed position, the reel foot 4 is compressively secured between the first hood 30 and the second hood 20. The compression serves to selectively secure the reel seat 10 in the closed position and oppose movement of the reel seat 10 in a number of directions such that a stable reel/rod combination is formed. In the closed position, the pivots 32, 36, 38 of the lever 22, linkage 24, and second hood 20 are oriented so that they create a cam over effect to lock the reel seat 10 in the closed position and prevent the reel seat 10 from moving to the open position until the user rotates the lever 22 away from the position substantially parallel to the longitudinal axis 40.

Figure 6A:
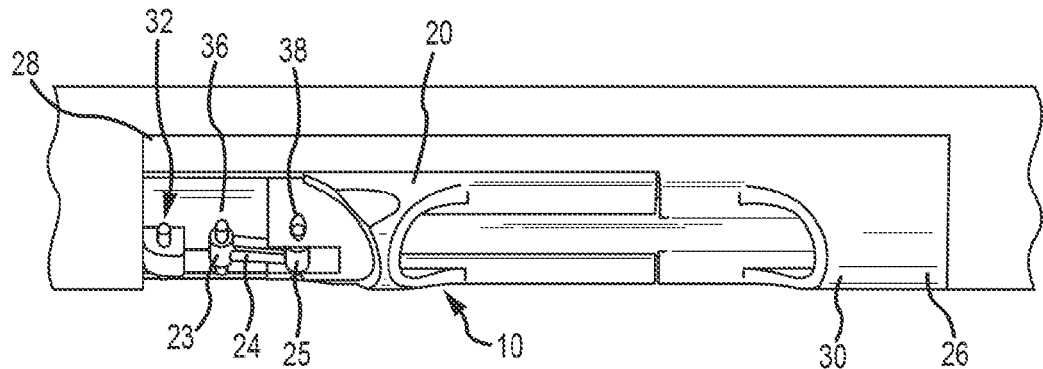
FIG. 6A is a partial perspective view of the reel seat of FIG. 2.
Figure 6B:
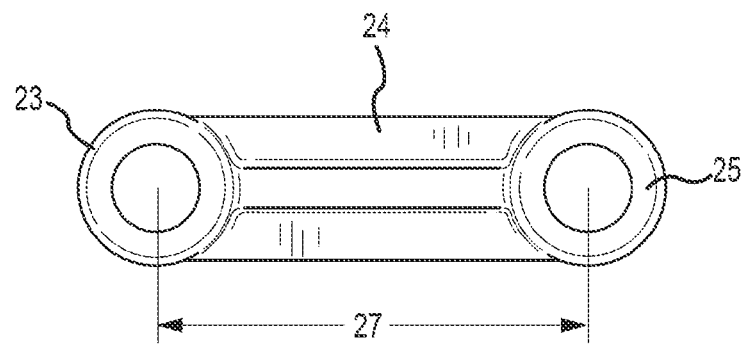
FIG. 6B is a side elevation view of a linkage according to one embodiment of the present invention.

Referring now to FIG. 6A, the reel seat 10 is illustrated with portions of the lever 22 removed to illustrate an embodiment of the linkage 24 of the present invention more clearly. FIG. 6B illustrates a side elevation view of the linkage 24 with a lever end 23 and a hood end 25. The linkage 24 has a length 27 between the centers of ends 23, 25. In one embodiment, the linkage 24 is a bar made of any substantially rigid material including a metal, a plastic, a polymer, a wood, and combinations thereof. In another embodiment, the linkage 24 is a string, cable, or ribbon. In still another embodiment, the linkage 24 is made of any non-rigid material operable to slide the second hood 20 over the second end 8 of the reel 2.

Figure 6C:
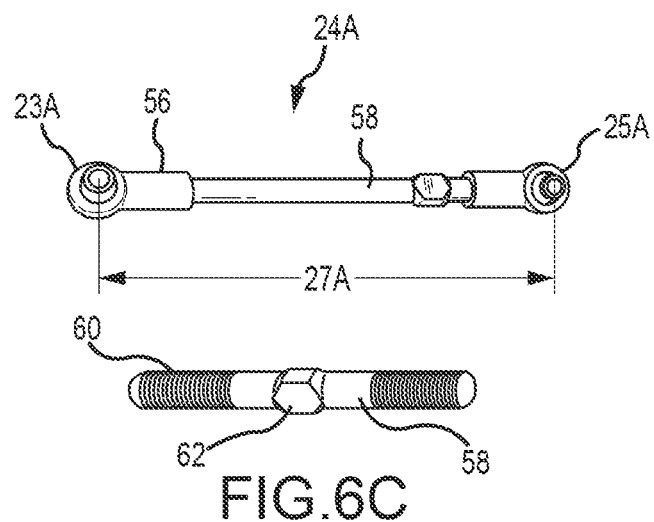
FIG. 6C is a top plan view of a linkage and a linkage body according to another embodiment of the present invention.

In one embodiment, illustrated in FIG. 6C, the distance between the second hood 20 and the first hood 30 when the reel seat 10 is in a closed position may be adjustable to accommodate reel feet of various sizes made by various manufacturers by adjusting the length 27A of the linkage 24A. The linkage 24A includes end pieces 56 that threadably engage a linkage body 58 that includes two threaded ends 60. Although FIG. 6C illustrates threads formed on an exterior surface of the linkage body 58, it will be appreciated by those of skill in the art that either the linkage body 58 or the ends 60 can have external threads.

The linkage body 58 may also have a grip 62 shaped to be grasped by the user to allow the user to rotate the body 58. The length 27A of the linkage 24A may be increased to a length selected by the user by rotating the body 58 in a first direction to decrease the amount of the body 58 which is threaded into the ends 60. Increasing the length 27A of the linkage 24A decreases the distance between the second hood 20 and the first hood 30 when the reel seat 10 is in the closed position. The user may increase the length 27A of the linkage 24A to accommodate a shorter or lower profile reel foot 4. The linkage 24A may also be rotated in a second opposite direction to decrease the length 27A thereby increasing the distance between the second hood 20 and the first hood 30 when the reel seat 10 is in the closed position. The user may decrease the length 27A of the linkage 24A to accommodate larger profile reel feet 4.

In another embodiment, not illustrated, the linkage 24A may be comprised of two or more nesting or telescoping members that can be adjusted by the user to change the length 27A. The adjustable linkage 24A may have a biasing member such as a spring. A lock, pin, or other means may be provided to secure the nesting or telescoping members in a desired length.

In still another embodiment, one or more interchangeable linkages 24 of various lengths 27 are provided. A user can adjust the distance between the second hood 20 and the first hood 30 when the reel seat 10 is in the closed position by selecting and installing a linkage 24 of an appropriate length to compressively engage a reel foot 4.

In yet another embodiment, the user may selectively adjust the distance between the second hood 20 and the first hood 30 by moving the second pivot point 36 that interconnects the lever 22 and the linkage 24. The second pivot point 36 may be moved closer to the first pivot point 32 to increase the distance between the second hood 20 and the first hood 30 to accommodate a larger reel foot 4. Alternatively, the second pivot point 36 may be moved closer to the grip portion 34 of the lever 22 to decrease the distance between the hoods 20, 30 to accommodate a fishing reel 2 with a smaller reel foot 4.

Figure 7:
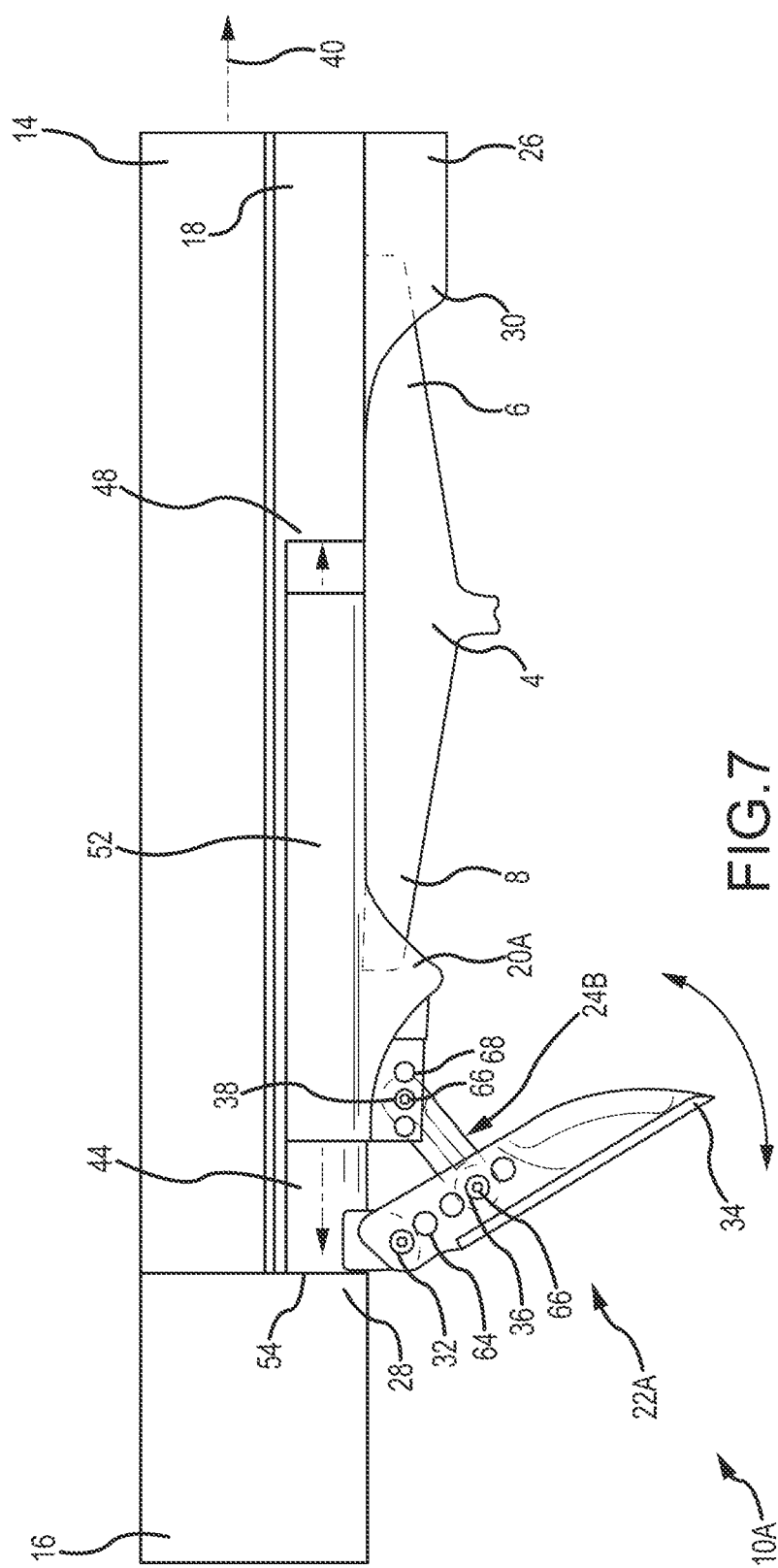
FIG. 7 is a partial cross-sectional side elevation view of a reel seat according to another embodiment of the present invention in a substantially open position with a reel seat positioned therein.

FIG. 7 illustrates a fragmented view of a reel seat 10A in a partially open position. A partial view of the reel foot 4 is illustrated releaseably secured to the reel seat 10A with the first end 6 within the first hood 30 and the second end 8 within the second hood 20A but not completely covered by the second hood 20A. The lever 22A is positioned substantially perpendicular to the longitudinal axis 40. A protrusion 52 of the second hood 20A is illustrated in one of the grooves 44 in the body 18. The protrusion is positioned between the stop 48 and a rearward end 54 of the groove 44. In this embodiment, the protrusion 52 is one continuous elongate shaped member. The distance between the stop 48 and the rearward end 54 of the groove 44 is greater than the length of the protrusion 52. Thus, there is space within the groove 44 for the second hood 20A to move toward either the forward end 26 or rearward end 28 of the body 18, as indicated by the arrows.

The reel seat 10A includes a lever 22A with multiple pairs of holes 64. The linkage 24B can be moved to different holes 64 to adjust the distance between the second hood 20A and the first hood 30 to compressively secure reel feet 4 of different sizes. The linkage 24B includes pins 66 that may be compressed to release the linkage 24B from the holes 64. The pins 66 are biased in an extended position that is longer than a compressed position. The user may selectively adjust the distance between hoods 20A, 30 by adjusting the second pivot point 36 by compressing the pins 66 to release the linkage 24A. The linkage 24A can then be moved to a different pair of holes 64 closer or further from the grip portion 34 and then releasing the compressible pins 66.

Optionally, the reel seat 10A may also include multiple pairs of holes 68 formed in the second hood 20A. The third pivot point 38 may be moved to adjust the distance between hoods 20A, 30 by compressing pins 66 and moving the linkage 24B to a different set of holes 68. In one embodiment, the second and third pivot points 36, 38 may be moved to different holes 64, 68 and the length 27 of the linkage 24 may also be adjusted to allow the user to adjust the distance between hoods 20A, 30 to compressively engage reel feet of various sizes.

Figure 8:
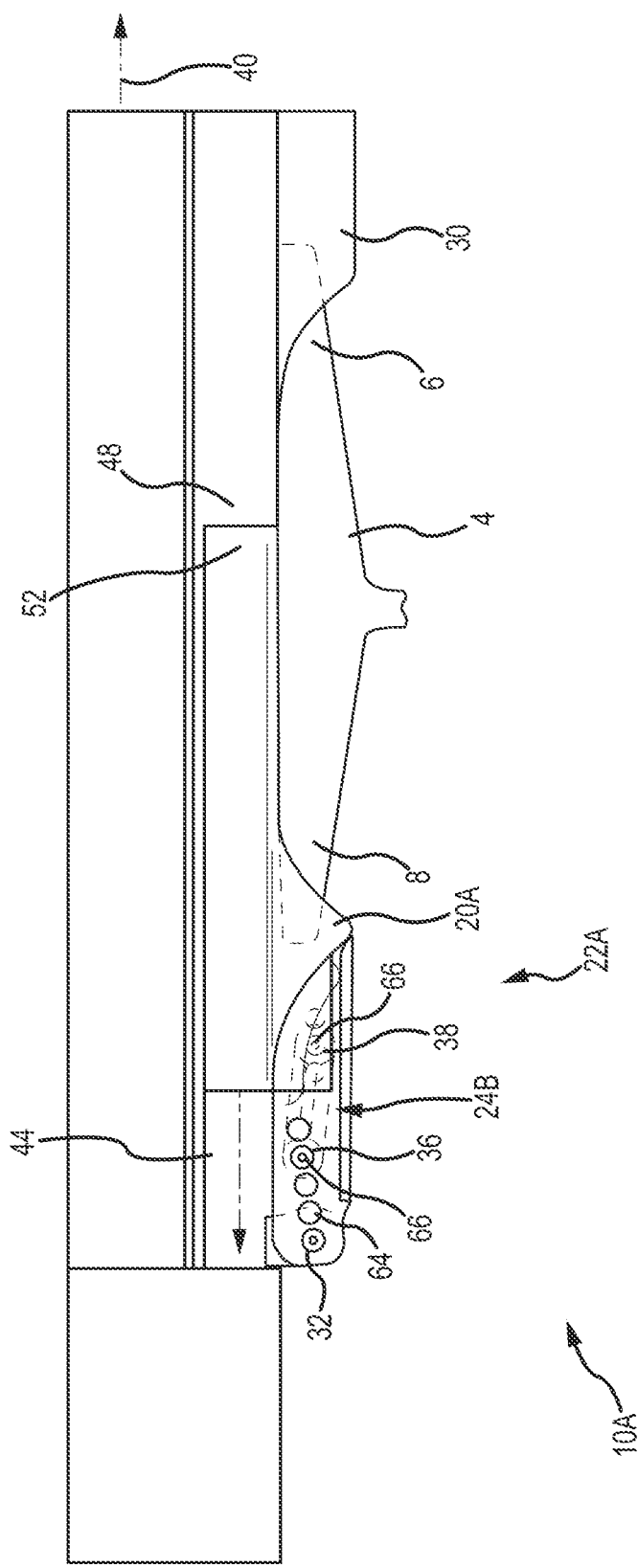
FIG. 8 is a partial cross-sectional side elevation view of the reel seat of FIG. 7 in a closed position.

Referring now to FIG. 8, a fragmented view of the reel seat 10A of FIG. 6 is illustrated in the closed position. The lever 22A has been rotated about pivot point 32 and is positioned substantially parallel to the longitudinal axis 40. The second hood 20A is positioned in a forward position of the groove 44 with a protrusion 52 in contact with the stop 48.

Figure 9A:
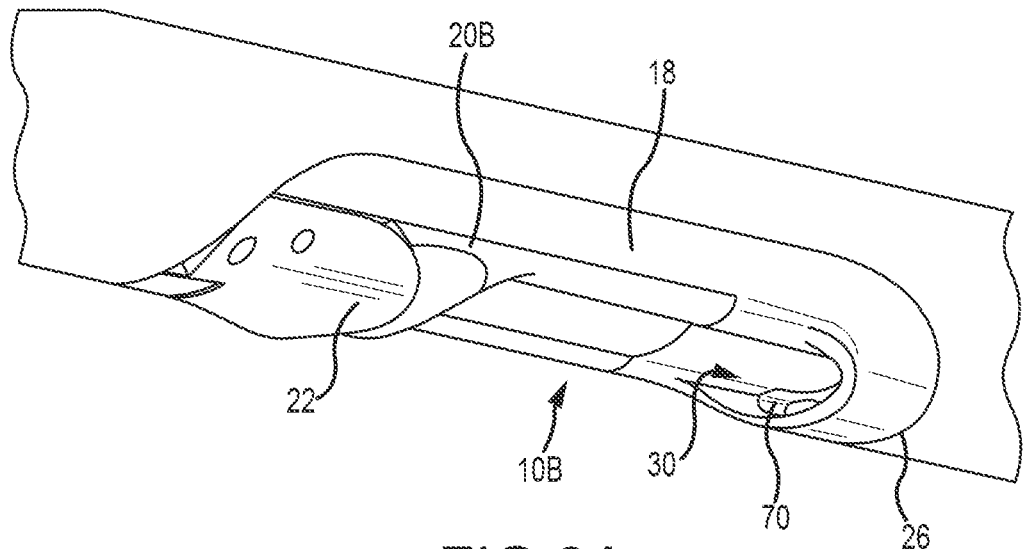
FIG. 9A is a perspective view of a reel seat of yet another embodiment of the present invention in a closed position.
Figure 9B:
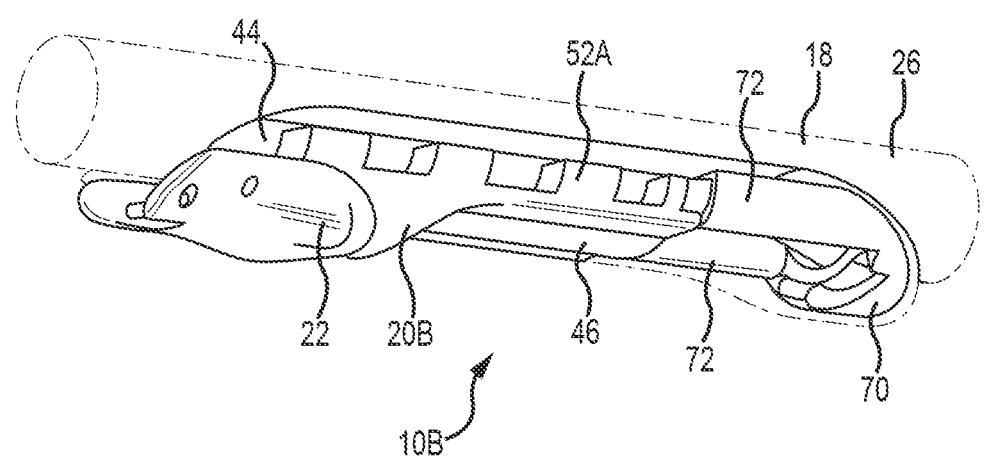
FIG. 9B is a partial view of the of the reel seat of FIG. 9A.

Referring now to FIGS. 9A and 9B, a real seat 10B of another embodiment of the present invention is illustrated in a closed position. A resistance member 70 is illustrated in the forward end 26 of the body 18 within the first hood 30. The resistance member 70 is adapted to deform to fit the first end 6 of the reel foot 4. The resistance member 70 is sized and selected from a material to enable the resistance member 70 to account for variations in the size and shape of reel feet 4 of various brands and styles. The resistance member 70 has two extensions 72 that contact the arms 46 of the second hood 20B when the reel seat 10B is in the closed position, as illustrated in FIG. 9B. Contact between the extensions 72 of the resistance member 70 and the arms 46 of the second hood 20B may prevent the reel seat 10B from moving freely from the closed position to the open position when no fishing reel 2 is secured by the reel seat 10B. When the reel seat 10B is in the closed position, contact between the resistance member 70 and the arms 46 of the second hood 20B creates resistance and produces a cam over effect between the second hood 20B, the linkage 24, and the lever 22.

The resistance member 70 may be made of an elastomer. In one embodiment, the resistance member 70 is made from thermoplastic polyurethane (TPU), thermoplastic rubber (TPR), or any other thermoplastic elastomer and combinations thereof. In another embodiment, the resistance member 70 is made of a substantially rigid material and includes springs or other biasing members. The springs may be made of a metal material.

The user can add or remove the resistance member 70 to the reel seat 10B. Although the resistance member 70 is illustrated in the first hood 30, it will be appreciated by those of skill in the art that a resistance member 70 may also be positioned in the second hood 20 or in both hoods 20, 30. The user may select a resistance member 70 of an appropriate size and shape to compressively engage a reel foot 4 and install the resistance member in the first hood 30 or the second hood 20. In one embodiment, resistance members 70 are adapted to compressively engage a reel foot 4 of a particular brand of fishing reel 2.

FIG. 9B also illustrates an embodiment of a second hood 20B with four pairs of protrusions 52A that extend into the groove 44 of the body 18. However, as will be understood by those of skill in the art, any number of protrusions 52 of any shapes, sizes, and spacing may be formed on the second hood 20 of the present invention.

Figure 10A:
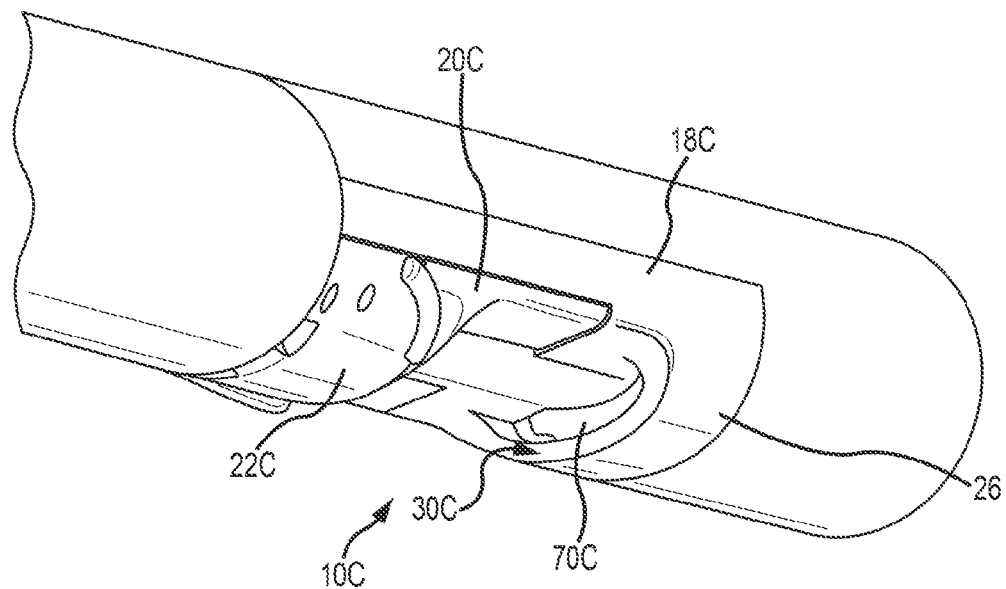
FIG. 10A is a perspective view of a reel seat of still another embodiment of the present invention in a closed position.
Figure 10B:
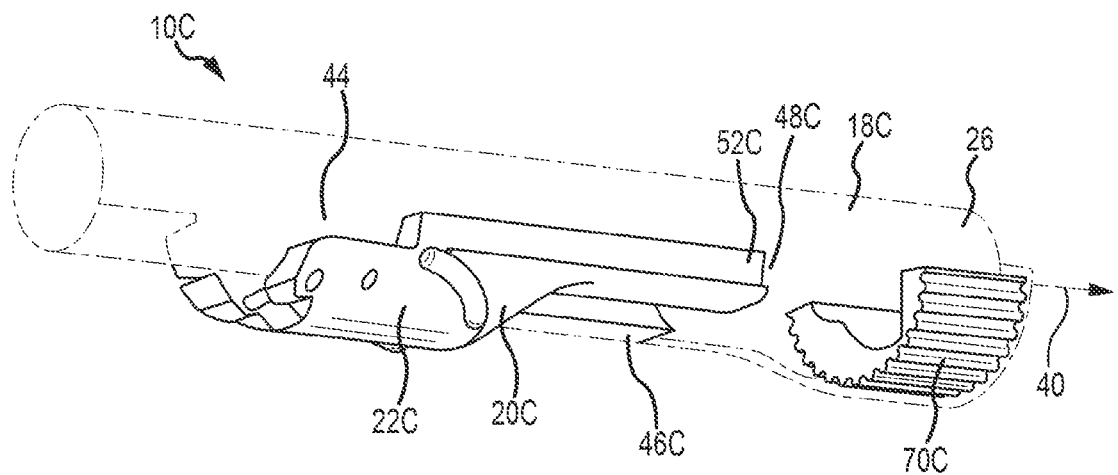
FIG. 10B is a partial view of the of the reel seat of FIG. 10A.
Figure 11A:
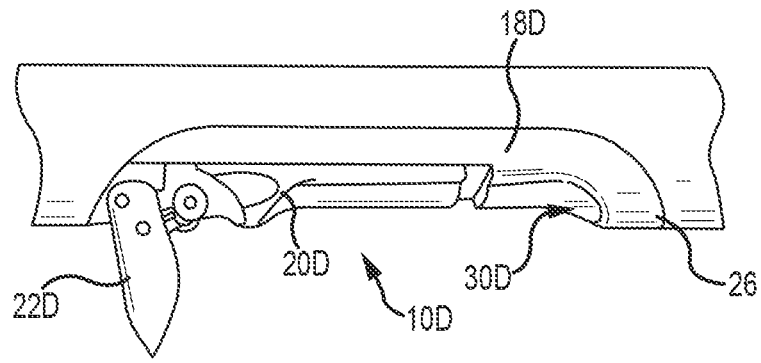
FIG. 11A is a side elevation view of a reel seat according to another embodiment of the present invention in an open position.
Figure 11B:
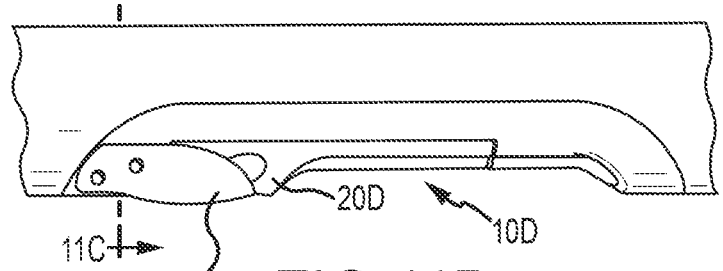
FIG. 11B is a side elevation view of the reel seat of FIG. 11A in a closed position.
Figure 11C:
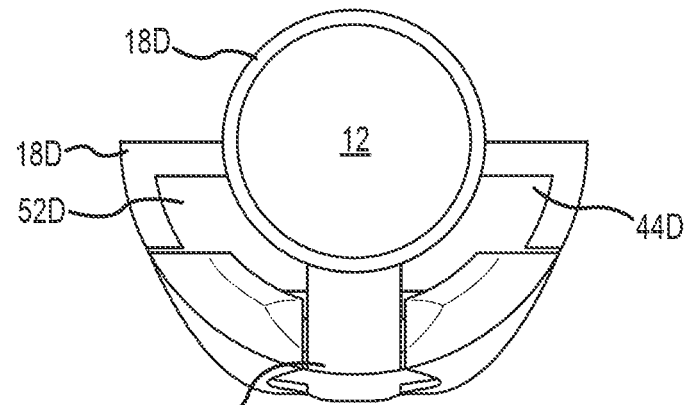
FIG. 11C is a partial cross-sectional rear elevation view of the reel seat of FIG. 11A.
Figure 11D:
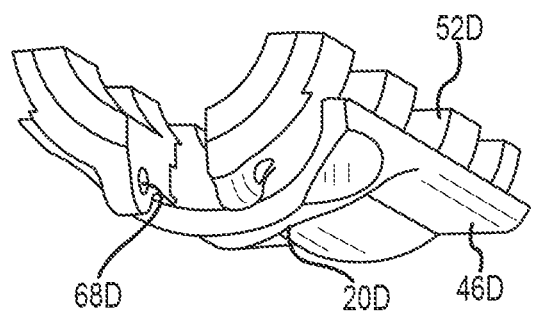
FIG. 11D is a perspective view of the second hood of the reel seat of FIG. 11A.

Referring now to FIGS. 10A-10B, yet another embodiment of a reel seat 10C of the present invention is illustrated. A resistance member 70C of another embodiment of the present invention is illustrated in the forward end 26 of the body 18C. In this embodiment, the resistance member 70C has a semi-circular shape with a plurality of ridges substantially parallel to the longitudinal axis 40 on a radially outer circumference of the resistance member 70C. The resistance member 70C does not contact the arms 46C of the second hood 20C when the reel seat 10C is in the closed position. The second hood 20C of this embodiment of the present invention has one pair of continuous elongate shaped protrusions 52C that extend in two grooves 44 of the body 18C. The protrusions 52C contact the stop 48C when the reel seat 10C is in the closed position, as illustrated in FIG. 10B.

Referring now to FIGS. 11A-11D, still another reel seat 10D of the present invention is illustrated. FIG. 10D is a detailed perspective view of a second hood 20D of one embodiment. The second hood 20D includes four pairs of protrusions 52D that each have a semi-circular shape. The protrusions 52D are adapted to fit into grooves 44D formed in the body 18D of the reel seat 10D. One of skill in the art will recognize that the grooves 44D and the protrusions 52D can be formed in a variety of lengths, shapes, and dimensions.

Figure 12A:
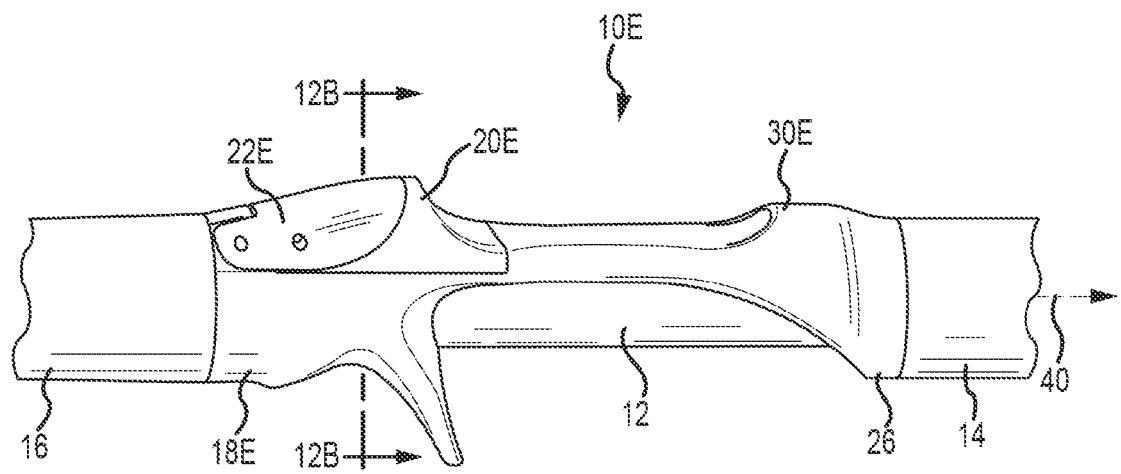
FIG. 12A is a side elevation view of a reel seat according to yet another embodiment of the present invention.
Figure 12B:
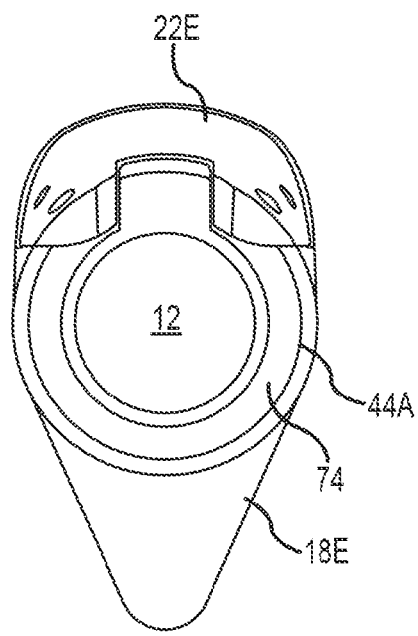
FIG. 12B is a cross-sectional rear elevation view of the reel seat of FIG. 12A.
Figure 12C:
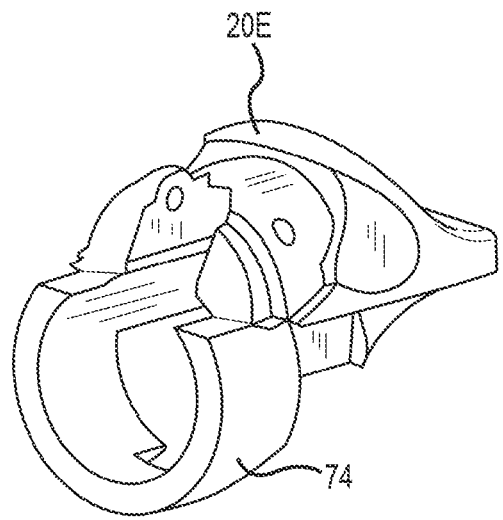
FIG. 12C is a perspective view of the second hood of FIG. 12A.

Referring now to FIGS. 12A-12C, yet another reel seat 10E of the present invention is illustrated. A longitudinal cavity 44A is formed within the body 18E around the longitudinal axis 40. The longitudinal cavity 44A extends at least partially from the rearward end of the body 18E toward the first hood 30E. The longitudinal cavity 44A has a shape adapted to slidably retain an extension 74 of the second hood 20E that wraps around the longitudinal axis 40 of the fishing rod 12. The extension 74 can move within the longitudinal cavity 44A substantially parallel to the longitudinal axis as the lever 22E is rotated. Although the reel seat 10E is illustrated in a casting reel seat body, the second hood 20E and extension 74 of this embodiment may be used with any reel seat 10 of the present invention.

Figure 13A:
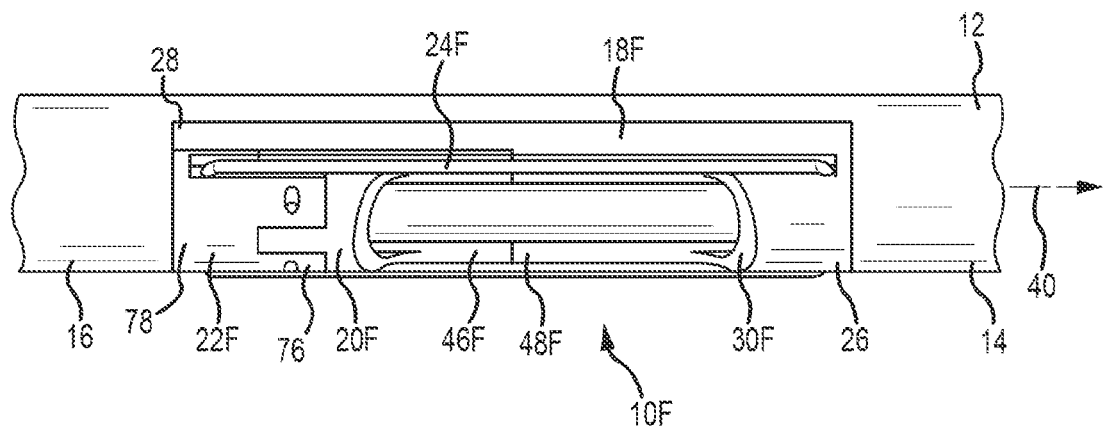
FIG. 13A is a perspective view of still another embodiment of a reel seat of the present invention in a closed position.
Figure 13B:
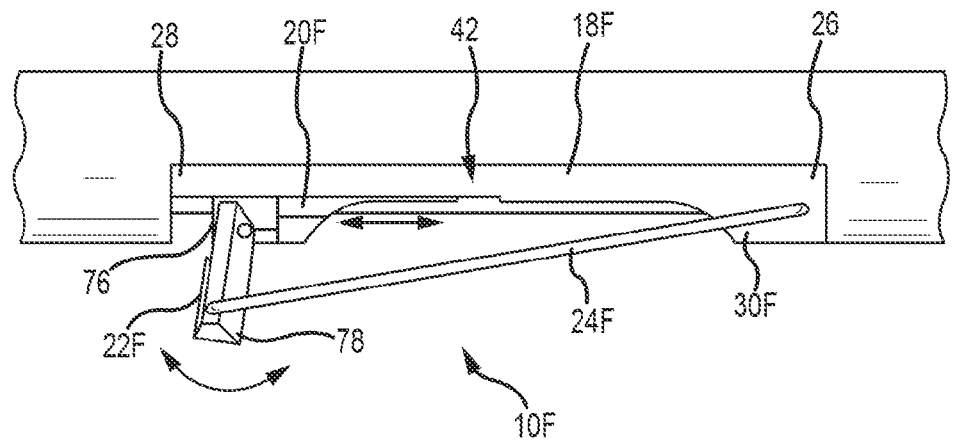
FIG. 13B is a side elevation view of the reel seat of FIG. 13A in an open position.

FIGS. 13A-13B illustrate yet another embodiment of a reel seat 10F of the present invention. The reel seat 10F includes a lever 22F with a first end 76 pivotally interconnected to a rearward end of a second hood 20F. A linkage 24F is interconnected to a second end 78 of the lever 22F and to the forward end 26 of a body 18F of the reel seat 10F. The linkage 24F may be formed of wire or a substantially rigid material; however, one of skill in the art will recognize that other materials may be used. When a user rotates the second end 78 of the lever 22F orthogonal to the longitudinal axis 40 of the fishing rod 12, the lever 22F actuates the second hood 20F and the second hood 20F slides forward or rearward in grooves formed in the body 18F. FIG. 13A illustrates the reel seat 10F in the closed position with the arms 46F in contact with the stop 48 of the body 18F. FIG. 13B illustrates the reel seat 10F in a substantially open position.

Figure 14A:
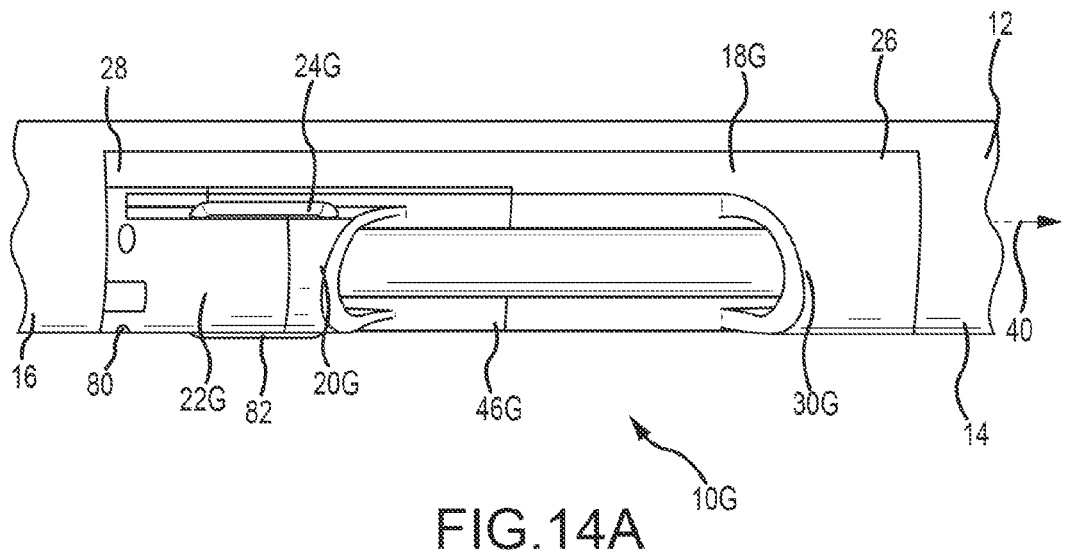
FIG. 14A is a perspective view of yet another embodiment of a reel seat of the present invention.
Figure 14B:
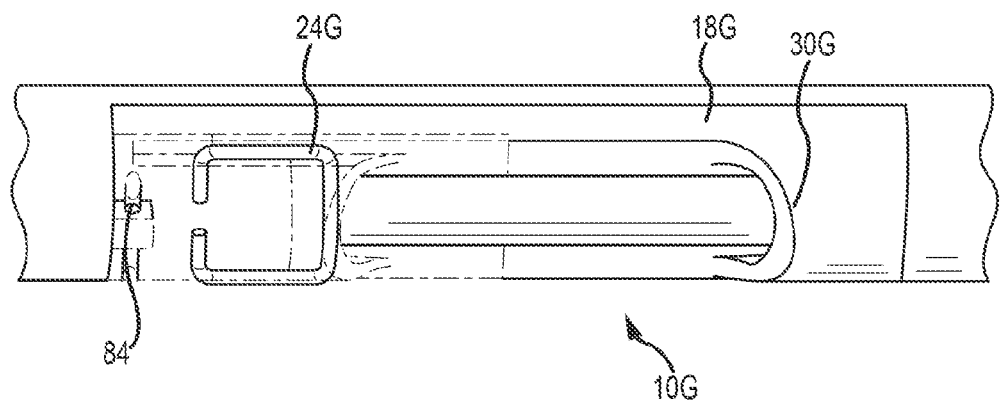
FIG. 14B is a partial perspective view of the reel seat of FIG. 14A.

Referring now to FIGS. 14A-14B, still another embodiment of a reel seat 10G of the present invention is illustrated in a closed position. A rearward end 80 of a lever 22G is pivotally interconnected to the body 18G by pin 84. A linkage 24G pivotally interconnects the lever 22G to a second hood 20G between the rearward end 80 and a forward end 82 of the lever 22G. The linkage 24G pushes or pulls the second hood 20G when the user rotates the lever 22G. To move the reel seat 10G to the open position (not illustrated), the user lifts the forward end 82 of the lever 22G and rotates the lever 22G from a position substantially parallel to the longitudinal axis 40 to a position substantially perpendicular to the longitudinal axis 40. As the lever 22G is rotated about the pin 84, the lever 22G pulls the second hood 20G toward the rearward end 28 of the body 18G. The linkage 24G may be formed of wire or a substantially rigid material. In one embodiment, the linkage 24G has a shape adapted to provide a spring resistance to prevent unintended or inadvertent movement of the lever 22G when the reel seat 10G is in the closed position.

The description of the present invention has been presented for purposes of illustration and description, but is not intended to be exhaustive or limiting of the invention to the form disclosed. The scope of the present invention is limited only by the scope of the following claims. The embodiments described and shown in the figures were chosen and described in order to best explain the principles of the invention, the practical application, and to enable those of ordinary skill in the art to understand the invention. While various embodiments of the present invention have been described in detail, it is apparent that modifications and alterations of those embodiments will occur to those skilled in the art. It is to be expressly understood that such modifications and alterations are within the scope and spirit of the present invention. Moreover, references made herein to "the present invention" or aspects thereof should be understood to mean certain embodiments of the present invention and should not necessarily be construed as limiting all embodiments to a particular description. The use of "including," "comprising," or "adding" and variations thereof herein are meant to encompass the items listed thereafter and equivalents thereof, as well as additional items.

What is claimed is:

1. A reel seat adapted to releasably interconnect a reel foot of a fishing reel to a fishing rod, the reel seat comprising:
    a body having a first hood with a shape adapted to retain a first end of the reel foot;
    a second hood slideably interconnected to the body, the second hood having a shape adapted to retain a second end of the reel foot;
    a lever having a pivot end and a grip end, the pivot end pivotally interconnected to the body at a first pivot point, wherein the first pivot point is affixed to and stationary with respect to the body; and
    a linkage having a lever end and a hood end, the lever end of the linkage pivotally interconnected to the lever at a second pivot point between the first pivot point and the grip end, and the hood end of the linkage pivotally interconnected to the second hood at a third pivot point, wherein a rotational force applied to the grip end of the lever is translated through the linkage to the second hood to move the second hood toward the first hood to compressively interconnect the reel foot in the reel seat.

2. The reel seat of claim 1, wherein a length of the linkage is adjustable.

3. The reel seat of claim 2, wherein the linkage further comprises a linkage body with ends threadably engaged by two end pieces, wherein rotating the linkage body in a first direction increases the length of the linkage, and wherein rotating the linkage body in a second opposite direction decreases the length of the linkage.

4. The reel seat of claim 2, wherein the linkage further comprises two or more telescoping members that are selectively adjustable to change the length of the linkage.

5. The reel seat of claim 1, wherein the lever further comprises two or more pairs of holes between the first pivot point and the grip end, wherein the lever end of the linkage may be moved from a first to a second of the two or more pairs of holes to move a location of the second pivot point.

6. The reel seat of claim 1, wherein the second hood further comprises two or more pairs of holes, wherein the hood end of the linkage may be moved from a first to a second of the two or more pairs of holes to move a location of the third pivot point.

7. The reel seat of claim 1, further including a resistance member positioned in the first hood wherein two arms extending from the second hood contact the resistance member when the reel seat is in a closed position.

8. The reel seat of claim 7, wherein the resistance member is comprised of an elastomer, a thermoplastic polyurethane, a thermoplastic rubber, a thermoplastic elastomer, and combinations thereof.

9. The reel seat of claim 1, further comprising:
    two longitudinal grooves formed in the body; and
    two protrusions extending from the second hood, each of the protrusions adapted to slidably engage one of the longitudinal grooves.

10. The reel seat of claim 1, further comprising:
    a cavity in the body encapsulating a longitudinal axis of the fishing rod; and
    an extension of the second hood wrapping around the longitudinal axis within the cavity.

11. The reel seat of claim 1, wherein the reel seat is located on a first side of the fishing rod and does not extend to a surface portion of a second opposite side of the fishing rod.

12. A reel seat adapted to releasably interconnect a reel foot of a fishing reel to a fishing rod, the reel seat comprising:
    a body having a first hood with a shape adapted to retain a first end of the reel foot;
    a second hood slideably interconnected to the body, the second hood having a shape adapted to retain a second end of the reel foot;
    a lever having a pivot end and a grip end, the pivot end pivotally interconnected to the body at a first pivot point;
    a linkage having a lever end and a hood end, the lever end of the linkage pivotally interconnected to the lever at a second pivot point between the first pivot point and the grip end, and the hood end of the linkage pivotally interconnected to the second hood at a third pivot point, wherein a rotational force applied to the grip end of the lever is translated through the linkage to the second hood to move the second hood toward the first hood to compressively interconnect the reel foot in the reel seat; and
    two arms extending from the second hood forwardly toward the first hood and movable together with the second hood, a forward end of each of the arms contacting a stop formed in the body when the reel seat is in a closed position.

13. The reel seat of claim 12, wherein the forward end of each of the arms is spaced from the stop in an open position and contacts the stop in the closed position.

* * * * *